United States Patent [19]

Ames

[11] Patent Number: 4,971,713
[45] Date of Patent: Nov. 20, 1990

[54] THERMAL ENERGY STORAGE COMPOSITIONS WITH NUCLEATING AGENTS

[75] Inventor: Douglas A. Ames, Manhattan Beach, Calif.

[73] Assignee: Electric Power Research Institute, Palo Alto, Calif.

[21] Appl. No.: 313,049

[22] Filed: Feb. 21, 1989

[51] Int. Cl.⁵ .............................................. C09K 5/00
[52] U.S. Cl. ........................................ 252/70; 165/10
[58] Field of Search ............................ 252/70; 165/10

[56] References Cited

U.S. PATENT DOCUMENTS 4,342,661  8/1982  Ehlers et al. ......................... 252/70
4,349,446  9/1982  Marks .................................... 252/70

FOREIGN PATENT DOCUMENTS 2539139  7/1984  France .

OTHER PUBLICATIONS

Stecher, Ed. *The Merck Index*, 8th Ed., 1968, p. 960.
Caustic Soda Handbook, Vulcan Chemicals, "Freezing Points of Caustic Soda Solutions".

*Primary Examiner*—Paul Lieberman
*Assistant Examiner*—Christine A. Skane
*Attorney, Agent, or Firm*—Watson, Cole, Grindle & Watson

[57] ABSTRACT

A 41° F. melting/freezing point NaOH in water solution employs a nucleating agent selected from the group consisting essentially of $CaCO_3$, $Fe_3O_4$, $FeO.TiO_2$, $SnO_2$, $TeO_2$, $LiAl(SiO_4)$ and mixtures thereof. Xanthan gum may be used as a dispersant.

15 Claims, No Drawings

THERMAL ENERGY STORAGE COMPOSITIONS WITH NUCLEATING AGENTS

BACKGROUND OF THE INVENTION

1. Field of the Invention

The present invention generally refers to the field of thermal energy storage, which may be abbreviated as TES, and more particularly to the storage of such energy by means of phase change materials, often referred to hereinafter as PCM's. By PCM's I refer to certain chemical compositions that store heat energy in one phase, which energy is then either released in the form of heat or which acquire heat from an ambient fluid as the PCM changes phase.

2. The Prior Art

The use of certain chemical compositions for "cool" thermal energy storage is an art that has yet to achieve its full market potential, although there are at present a plurality of such "cool" storage installation in successful commercial operation in this country. The use of PCM's to store coolness, i.e., to freeze at a predetermined temperature, usually below about 50° F., has successfully been carried out, particularly where time-of-use rates make such applications commercially practical. Commercial feasibility occurs where the differential between peak and off-peak electric energy rates, as well as the application of a so-called demand charge for the use of electricity during peak periods, makes the installation of a TES system viable, e.g., the cost of the system, as measured against the savings, provides a pay back period of perhaps three years.

Using a cool storage TES system with a PCM having a melting/freezing point plateau of somewhat below 50° F., the charging cycle is automatically timed to take place during off-peak hours. By the provision of suitable piping between a chiller and a tank holding containerized PCM's, cold water from the chiller is circulated to the tank, into contact with the containers of PCM's, and then circulated from the tank back to the chiller for recooling. This procedure continues until the PCM's have been frozen, i.e., until they have changed their state from liquid to solid, thereby transferring their heat of fusion to the cold water that has chilled them, or another cold fluid used for that purpose. That is the charging cycle.

In the discharge cycle, line water at a temperature in excess of the melting point of the PCM is circulated through the tank of frozen, containerized composition, and thereby chilled approximately to the temperature of the frozen PCM's which, in a manner of speaking, may be said to have stored coolness. As the relatively warm water or other fluid is passed into thermal contact with the frozen PCM's, the latter melt, and in so doing use the heat energy of the relatively warm water to satisfy their heat of fusion, thereby lowering the temperature of the water, which is then circulated to the water-to-air heat exchangers in the structure to be cooled. This procedure continues until substantially all of the coolness stored in the frozen PCM's has been exhausted by the melting of the PCM's and, if desirable, by the use of the specific heat differential between the PCM's in liquid form and the warmer water.

By properly sizing the TES unit, with knowledge of the extent of the peak period the TES system can supply all of the cooling requirements of a building for the entirety of the on-peak period, thereby making it unnecessary to use the high electricity consumption chiller during on-peak periods. Alternatively, the TES system can supply only a part of the on-peak load, which would permit the use of a smaller chiller. In either mode of use, a PCM thermal energy storage system can effect substantial savings to the owner and provide a desirable leveling effect to the 24-hour load profile of an electric utility during summer months when electricity use for air conditioning is maximal.

Any PCM utilized for thermal storage will have generic requirements. These include maintenance of a near constant temperature throughout the phase change cycle, also referred to as a melting/freezing point plateau, a relatively high latent heat of fusion, and a relatively high density. Such a PCM will be able to store large quantities of coolness, so as to make its use practical in commercial installations. Of course, the PCM must maintain its desirable thermal energy storage capacity over thousands of freeze-thaw cycles, indeed almost indefinitely, and must be abundantly available and relatively inexpensive. Such compositions are available and now in use.

From a commercial point of view, the composition that has thus far found greatest application as a PCM is a eutectoid salt composition based on sodium sulfate decahydrate. This salt, like most materials, including water, has a tendency to supercool; however, many years ago Dr. Maria Telkes, a pioneer in the field, discovered that sodium tetraborate would ameliorate the problem of supercooling of this type of PCM. Unfortunately, the lowest temperature at which a sodium sulfate decahydrate eutectoid salt mixture has been found to freeze is 47–48° F. As a consequence, in some situations where a full storage system design is employed or for other reasons, and it is requisite that chilled water be supplied from the PCM tank at less than 47° F., a sodium sulfate decahydrate PCM is not appropriate.

More recently, it has been learned that a specific NaOH/H$_2$O solution can be employed as a PCM for cool storage. The applicant has become aware that an aqueous solution of about 46–47% NaOH in water has a freezing/melting point plateau at approximately 41° F., a highly propitious temperature for a PCM. At this temperature the water solution of NaOH melts congruently, i.e., when it melts, it exists as a stable solid in equilibrium with a liquid of the same composition. With PCM's that do not melt congruently, e.g., sodium sulfate-based eutectoid salts, a thickening or gelling agent may be used to maintain this stable solid/liquid equilibrium. Since at that particular concentration, rather than as some other, random concentration, the NaOH/H2O solution has a melting/freezing point plateau, it is exceptionally well suited for employment as a PCM.

It will be apparent that at a random freezing/melting point on the liquidus line of a phase diagram of a NaOH/H$_2$O binary system, freezing or melting will only begin. As, due to such partial freezing or melting, the concentration of the sodium hydroxide changes, so does the freezing/melting point, and there is no freezing/melting point plateau. In a sodium hydroxide-water system or, indeed, any system that will be adapted for employment as a PCM, it is requisite that there be a substantial plateau at the freezing/melting point; otherwise, on melting, for example, a varying melting point would cause the fluid flowing from the storage tank to do so at varying temperatures, making that fluid unsuitable for use in air conditioning a building because of its non-constant exit temperatures.

With all the benefits of a 41° F. melting/freezing point NaOH in water solution, one serious drawback to its use is that significant supercooling tends to occur. In the laboratory this can be remedied by seeding, agitation, etc.; in a commercial installation where many thousands of containers of the PCM are stored in a tank and are not subject to easy access, the problem cannot be easily rectified. Experimentation has confirmed that the means for overcoming supercooling in eutectoid salt compositions—sodium tetraborate decahydrate—is ineffective in performing that function in a 41° F. melting point NaOH/H2O solution.

As a consequence, it is a primary object of the present invention to provide a supercooling inhibitor for a 47-48% NaOH/water solution so that when the temperature of such solution is lowered below the 41° F. level, crystallization of the solution is initiated without additional seeding or agitation.

It is another object of this invention to provide such a supercooling inhibitor, which may also be termed a nucleating agent, which will be economically effective, abundantly available, and which will perform its function in small quantities relative to the remainder of the NaOH/$H_2$ solution, since whatever percentage of the total PCM is occupied by the nucleating agent, that percent is a part of the entire solution that does not per se freeze and, therefore, does not itself store cool energy by its heat of fusion.

SUMMARY OF THE INVENTION

The basis of the present invention, as presently understood, is a composition of matter suitable for use in storing cooling capacity by its heat of fusion, which comprises a major amount of a sodium hydroxide-water solution in which the ratio of NaOH to $H_2O$ is about 46-47 to 54-53 by weight. For convenience, in the claims and elsewhere in the specification, that ratio will be referred to as about 47 to 53, NaOH to $H_2O$. Further, the solution contains a nucleating agent in an amount sufficient to inhibit supercooling of the solution. The nucleating agent is selected from the group consisting essentially of $CaCO_3$, $Fe_3O_4$, $FeO.TiO_2$, $SnO_2$, $TeO_2$ and $LiAl(SiO_4)$, and mixtures thereof.

A highly preferred nucleating agent is calcium carbonate, if for no other reason than because it is effective and so readily available at a reasonable cost. Indeed, it is effective in its commercial forms as are the other nucleating agents named hereinbefore. Thus, calcium carbonate may be used in the form of granular limestone, or it may be used as commercially available whiting, in which it has been ground to a powder. Both of these forms of calcium carbonate are in wide, commercial use. As stated, all of the agents may be used in commercial form as agglomerates, e.g., the $Fe_3O_4$ as magnetite and the $LiAl(SiO_4)$ as petalite.

In addition, the composition of the present invention may also include a dispersant for maintaining the nucleating agent in suspension in the solution. The preferred dispersant is xanthan gum, which has been found to be particularly effective in maintaining petalite agglomerates in suspension.

DETAILED DESCRIPTION OF PREFERRED EMBODIMENTS OF THE INVENTION

As has been stated, one preferred embodiment of the invention includes calcium carbonate as a nucleating agent. Limestone and whiting are so economic to use in these relatively small amounts that their use adds only a fraction of a penny to the cost of the PCM on a per pound basis. Moreover, a highly refined limestone is not necessarily required; even a commercial form will be effective for its use as a nucleating agent. Indeed, a granular material has been found to be well adapted under certain circumstances.

The amount of calcium carbonate to be utilized may be determined on a trial and error basis, using an amount sufficient to accomplish its purpose, but recognizing that the more nucleating agent that is used, the less solution will be available to freeze for coolness storage. As a consequence, it has been determined that the addition of about 3 to 5 parts by weight of calcium carbonate is an effective amount to inhibit supercooling by nucleation, with 3 parts of the chemical commercially available as limestone from Van Water and Rodgers, Inc., of Los Angeles, Calif., having been subjected to testing and having been found to be effective. In the sample tested, the agglomerates appear to have a mean diameter of about 10 mm.

With respect to the other nucleating agents, the operable $Fe_3O_4$ was purchased from Westwood Ceramic Supply Company of City of Industry, Calif., as granular magnetite. The $FeO.TiO_2$ was also purchased from Westwood Ceramic under the name, ilmenite, which has a chemical composition of $FeTiO_3$, or $FeO.TiO_2$. The $LiAl(SiO_4)$ was purchased as petalite. The magnetite appeared to have a mean diameter of about 50 mm in its granular form, as did the ilmenite. The tin oxide was less agglomerated, but the petalite had larger agglomerates, varying from about 100 mm to 400 mm.

When the nucleating agent tends to "crust-over" along the bottom of the container, it has been found preferable to utilize a dispersing agent to keep the nucleating agent readily available at any location within the body of the solution at which crystallization on freezing is most likely to occur. The use of a dispersant is perhaps not necessary in many instances, such as when calcium carbonate is used, although further cycling tests may indicate that it should be utilized.

Where it has been determined that it is preferable to use a dispersant, the dispersant of choice is a seaweed extract known as xanthan gum. Such gum is a natural high-molecular weight, branched polysaccharide. It functions as a hydrophilic colloid to thicken, suspend and stabilize water-based systems, and has been found to be particularly effective in a highly alkaline environment, such as that of the present invention. It is important to select the proper dispersant for a particular medium in which dispersion is to take place. In the aqueous NaOH medium in which a nucleating agent is to be dispersed according to the present invention, xanthan gum has been found to be significantly superior to other dispersants.

In actual practice, four parts of calcium carbonate in the form of whiting were added to 47 parts of NaOH and 53 parts of water, and mixed rapidly, then containerized. The mixture in containers was thereafter subjected to cooling in a water tank maintained at 36° F. The temperature of the solution dropped to about 36.5° F., then rapidly ascended after a period of about 2 hours to a temperature of 40.0° to 40.5° F., where it leveled off for about 5 hours. The PCM solution appeared to be completely frozen after approximately 9 hours of thermal contact with the 36° F. water. On further cooling with the water, the temperature of the frozen solution dropped to about 36° F. over the next two hours.

When the same freezing curves were plotted with about 5 parts of granular magnetite ($Fe_3O_4$) added to the $NaOH/H_2O$ solution, the results were similar except that the time required to have the temperature of the solution rise to its freezing point, measured at approximately 40.8° F., was about 1 hour longer than with the calcium carbonate. Such time was 6 hours, and freezing was completed after 10 hours. The temperature of the PCM using magnetite as a nucleating agent reached the temperature of the coolant, 36° F., after approximately 13 total hours.

Similar test results were obtained with the other materials used as nucleating agents, with variations. Both the ilmenite and tin oxide had sharply rising curves that indicated when their effect as nucleating agents occurs. Such nucleating effectiveness occurred earlier with the ilmenite than the tin oxide, and the freezing point of the ilmenite-nucleated solution reached 41° F. Of all the materials used, the calcium carbonate appeared to be as good or better than the rest, although all were effective. Thus, at present the most preferred agent is calcium carbonate in the form of limestone or whiting, which may have a mean diameter of about 10 mm and in an amount of about 4 parts by weight added to 47 parts NaOH and 53 parts $H_2O$. No xanthan gum has been determined to be necessary for use in conjunction with the calcium carbonate nucleating agent. However, when use of xanthan gum as a dispersant is indicated, it was used in about 1 to 3 parts, preferably 2 parts by weight, in addition to 3 parts petalite, 47 parts NaOH and 53 parts $H_2O$. Generally, petalite and tellurite ($TeO_2$) appear most likely to require a dispersant, and are not preferred.

While this specification has been written with respect to preferred embodiments of my invention, certain modifications and alterations thereof will be apparent to those of skill in this art. As to all such obvious modifications and alterations, it is desired that they be included within the scope of the present invention, which is to be limited only by the purview, including equivalents, of the following, appended claims.

What is claimed is:

1. A composition of matter suitable for use in storing cooling capacity by its heat of fusion, comprising a major amount of a sodium hydroxide-water solution in which the ratio of sodium hydroxide to water is about 47 to 53, and a nucleating agent in an amount sufficient to inhibit extended supercooling of the solution, said nucleating agent being selected from the group consisting $Fe_3O_4$, $FeO.TiO_2$, $SnO_2$, and $LiAl(SiO_4)$, and mixtures thereof.

2. A composition of matter as claimed in claim 1, in which said nucleating agent is in the form of agglomerates.

3. A composition of matter as claimed in claim 2, in which said agglomerates have mean diameters of about 10 mm to 400 mm.

4. A composition of matter as claimed in claim 1, in which said nucleating agent is $Fe_3O_4$.

5. A composition of matter as claimed in claim 4, in which said composition of matter is commercially available magnetite.

6. A composition of matter as claimed in claim 1, in which said nucleating agent is $LiAl(SiO_4)$.

7. A composition of matter as claimed in claim 6, in which said nucleating agent is commercially available petalite.

8. A composition of matter suitable for use in storing cooling capacity by its heat of fusion, comprising a major amount of a sodium hydroxide-water solution in which the ratio of sodium hydroxide to water is about 47 to 53, and a nucleating agent in an amount sufficient to inhibit extended supercooling of the solution, said nucleating agent being selected from the group consisting of $FE_3O_4$, $FeO.TiO_2$, $SnO_2 LiAl(SiO_4)$, and mixtures thereof, and a dispersant in an amount effective to maintain the nucleating agent in suspension in said NaOH-water solution.

9. A composition of matter as claimed in claim 8, in which said nucleating agent is $FE_3O_4$.

10. A composition of matter as claimed in claim 8, in which said composition of matter is commercially available magnetite.

11. A composition of matter as claimed in claim 8, in which said nucleating agent is $LiAl(SiO_4)$.

12. A composition of matter as claimed in claim 8, in which said nucleating agent is commercially available petalite.

13. A composition of matter suitable for use in storing cooling cap city by its heat of fusion, comprising a major amount of a sodium hydroxide-water solution in which the ratio of sodium hydroxide to water is about 47 to 53, and a nucleating agent in an amount sufficient to inhibit extended supercooling of the solution, said nucleating agent being selected from the group consisting of $CaCO_3$, $Fe_3O_4$, $FeO.TiO_2$, $SnO_2$, $TeO_2$, $LiAl(SiO_4)$, and mixtures thereof, and xanthan gum in an amount effective to maintain the nucleating agent in suspension in said NaOH-water solution.

14. A composition of matter as claimed in claim 13, in which said nucleating agent is $FE_3O_4$.

15. A composition of matter as claimed in claim 13, in which said nucleating agent is commercially available magnetite.

* * * * *